United States Patent [19]
Tolan

[11] Patent Number: 5,868,557
[45] Date of Patent: Feb. 9, 1999

[54] METHOD AND APPARATUS FOR THE SEPARATION OF HAZARDOUS WASTE FROM GROUNDWATER

[76] Inventor: Peter J. Tolan, 30 Greenfield La., Scituate, Mass. 02066

[21] Appl. No.: 31,337

[22] Filed: Feb. 26, 1998

Related U.S. Application Data

[62] Division of Ser. No. 399,188, Mar. 6, 1995, Pat. No. 5,795,474.

[51] Int. Cl.⁶ ...................................................... F04B 49/00

[52] U.S. Cl. .......................... 417/297; 417/279; 417/313; 166/53; 166/75.11; 137/67

[58] Field of Search .................................... 417/279, 297, 417/313; 166/53, 75.11, 250.01; 137/67, 68.11

[56] References Cited

U.S. PATENT DOCUMENTS

| | | | |
|---|---|---|---|
| 4,678,040 | 7/1987 | McLaughlin et al. | 166/370 |
| 5,036,875 | 8/1991 | Thiltgen | 137/74 |
| 5,271,467 | 12/1993 | Lynch | 166/53 |

*Primary Examiner*—Charles G. Freay
*Attorney, Agent, or Firm*—Damon J. Borrelli

[57] ABSTRACT

Disclosed is a method and apparatus for the continuous remediation of a site contaminated with a hazardous substance. The remediation apparatus includes a material selectively permeable to the hazardous substance located at the site. Once isolated, the hazardous substance is removed to a remote vessel by mechanical means or by utilization of an gas-injection system. The invention also contemplates a valve configured to protect remediation apparatuses from detrimental overloadings of hazardous substances during a remediation procedure.

4 Claims, 4 Drawing Sheets

METHOD AND APPARATUS FOR THE SEPARATION OF HAZARDOUS WASTE FROM GROUNDWATER

CROSS-REFERENCE TO EARLIER FILED APPLICATION

This application is a division of U.S. Pat. application Ser. No. 08/399,188, now U.S. Pat. No. 5,795,474, entitled METHOD AND APPARATUS FOR THE SEPARATION OF HAZARDOUS WASTE FROM GROUNDWATER, of inventor Peter J. Tolan, filed Mar. 6, 1995.

BACKGROUND OF THE INVENTION

1. Field of the Invention

The present invention relates to a method and apparatus for treating a site contaminated with a hazardous substance. More particularly, the invention relates to a method and apparatus for remediating soil and groundwater in a site contaminated with a hazardous substance.

2. Description of the Prior Art

Worldwide, the storage and transportation of hazardous substances requires countless tanks and pipelines. Substances typically processed in these facilities include petroleum distillates, industrial solvents, and industrial wastes. Due to the dangers presented by storing and transporting concentrated solutions of these materials, engineers and government agencies conduct extensive research and development to insure the tanks and pipelines used will effectively and safely contain these materials. Weathering and unforseen engineering limitations, however, often cause the facilities to fail, resulting in the release of chemicals into the environment.

The failure of storage tanks and pipelines impacts on the physical and economic vitality of the contaminated area. The release of concentrated chemical solutions typically causes extensive damage to the local ecosystem by contaminating or killing indigenous plant and animal life. More remote ecosystems may be affected if the contamination migrates from the site by entering the local groundwater flow. Further, local laws often require that contaminated areas be remediated, and certified as such, prior to sale or rental. These laws often result in land being left fallow for years or decades. In extreme cases, the inability to remediate contaminated sites renders industrial or residential areas uninhabitable, forcing owners and employees to evacuate the area.

Several methods are currently employed to remediate sites contaminated with hazardous substances. Unfortunately, available methodologies are often limited by soil conditions which, among other things, effect the rate of migration of hazardous contaminants. Also impacting on the usage of available remediation techniques is the size and configuration of the contamination plume. At present, a common practice for the remediation of contaminated sites consists of locating a pumping system at or near the center of the plume. Contaminated groundwater is then pumped to the surface at a rate sufficient to create a cone of depression. The cone of depression causes floating contaminant to flow into the pumping well where the separation of contaminant from the groundwater can be accomplished using, for example, slow moving vertical flat, or round, belts made of oleophilic and hydrophilic materials. Although effective for some applications, the physical size of these systems, and their power requirements, can render them inappropriate.

A need has arisen for an improved method and apparatus for the remediation of sites contaminated with hazardous substances.

SUMMARY OF THE INVENTION

It is an object of the present invention to provide a method and apparatus for the remediation of a site contaminated with a hazardous substance.

It is a further object of the invention to provide a method and apparatus capable of commencing remediation within a short period after arrival at a site contaminated with a hazardous substance.

It is a yet another object of the invention to provide a method and apparatus which is effective at ground level and at depths substantially below the ground surface.

It is yet a further object of the invention to provide a method and apparatus which provides continual, efficient treatment of a contaminated site by protecting the treating system from overloadings of the contamination.

The remediation apparatus of the invention generally includes a first chamber and a second chamber. The remediation apparatus also preferably includes a buoyancy adjusting means. In operation, the buoyancy adjusting means changes the position of the apparatus of the invention in response to the volume of hazardous substance removed from the site.

Structurally, the first and second chambers define a pair of longitudinally extending, tubular, interior chambers. The two chambers are joined together by a connecting means. The sides of the first chamber are formed of a membrane that is selectively permeable to the hazardous substance contaminating the site. The membrane can be hydrophobic and oleophilic. In this configuration, the membrane is selectively permeable to hydrocarbon substances. The selective permeability of the membrane permits only hazardous substances to migrate from the surrounding contaminated area and into the first chamber. Once isolated in the first chamber, the contaminating substance flows into the second interior cavity via the connecting means where it is collected.

Once the hazardous substance is collected in the second cavity, it can then be removed from the site for processing. Removal from the second cavity can be done by pouring off the hazardous substance into a containment vessel. Alternatively, the hazardous substance can be remotely removed from the second cavity by injecting an inert gas into the second cavity. When gas-injection is utilized, a valve is positioned in the connecting means between the first and second cavities. This valve prevents back-flow of the gas into the first cavity and, as a result, a loss of pressure.

The invention also contemplates a valve that functions to protect remediation apparatuses. In particular, the valve acts to protect apparatuses from overloadings of the hazardous substance. The valve is typically positioned intermediate a subsurface pumping system and a means for connecting the valve to a containment or treatment vessel. The subsurface pumping system removes the hazardous substance from the site.

The protective valve of the invention is movable from a first open position to a second closed position in response to the concentration of the hazardous substance removed from the site. The concentration sensitive operation of the valve provides the desired protection from potentially detrimental overloadings of the contaminating hazardous substance. The valve includes a valve housing having a fluid inlet port, a fluid exhaust port, and a bore in fluid communication with the inlet and exhaust ports. A valve means is movably positioned in the bore so that in the first open position flow is allowed between the inlet and exhaust ports. When the valve means moves to its second closed position, communication is blocked between the inlet and exhaust ports. A sensor means directs movement of the valving means from the open position to the closed position. The sensor is sensitive to the concentration of the hazardous substance removed from the site. More particularly, the sensor means closes the valving means when a selected concentration is exceeded.

Other general and specific objects of the invention will in part be obvious and will in part appear hereinafter.

The invention accordingly comprises the method and apparatus embodying steps, features of construction, combinations of elements, and arrangements of parts adapted to effect such steps, as exemplified in the following detailed disclosure, the scope of the invention is indicated in the claims.

BRIEF DESCRIPTION OF THE DRAWINGS

For a fuller understanding of the nature and objects of the invention, reference should be made to the following detailed description and the accompanying drawings, in which.

DESCRIPTION OF PREFERRED EMBODIMENTS

The invention features a method and apparatus for the remediation of sites contaminated with hazardous substances. The invention includes both a remediation apparatus and a valve configured to protect apparatuses from overloadings of the hazardous substance. The invention produces a safer, increased rate of remediation in the contaminated area when compared to other biological, chemical, and physical remediation techniques.

Figure 1:
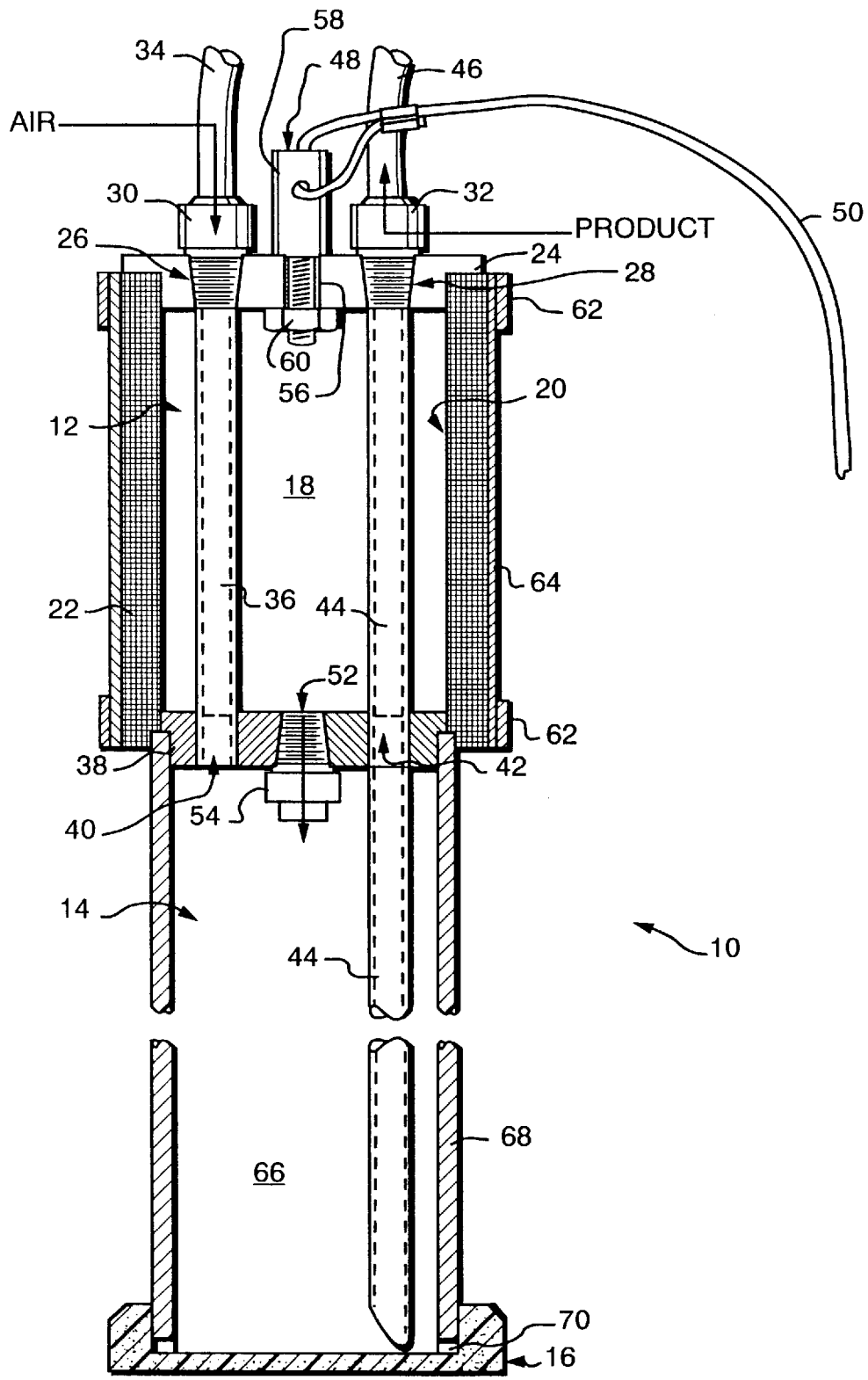
FIG. 1 is a side view, partly cut-away, of the remediation apparatus of the invention.
Figure 2:
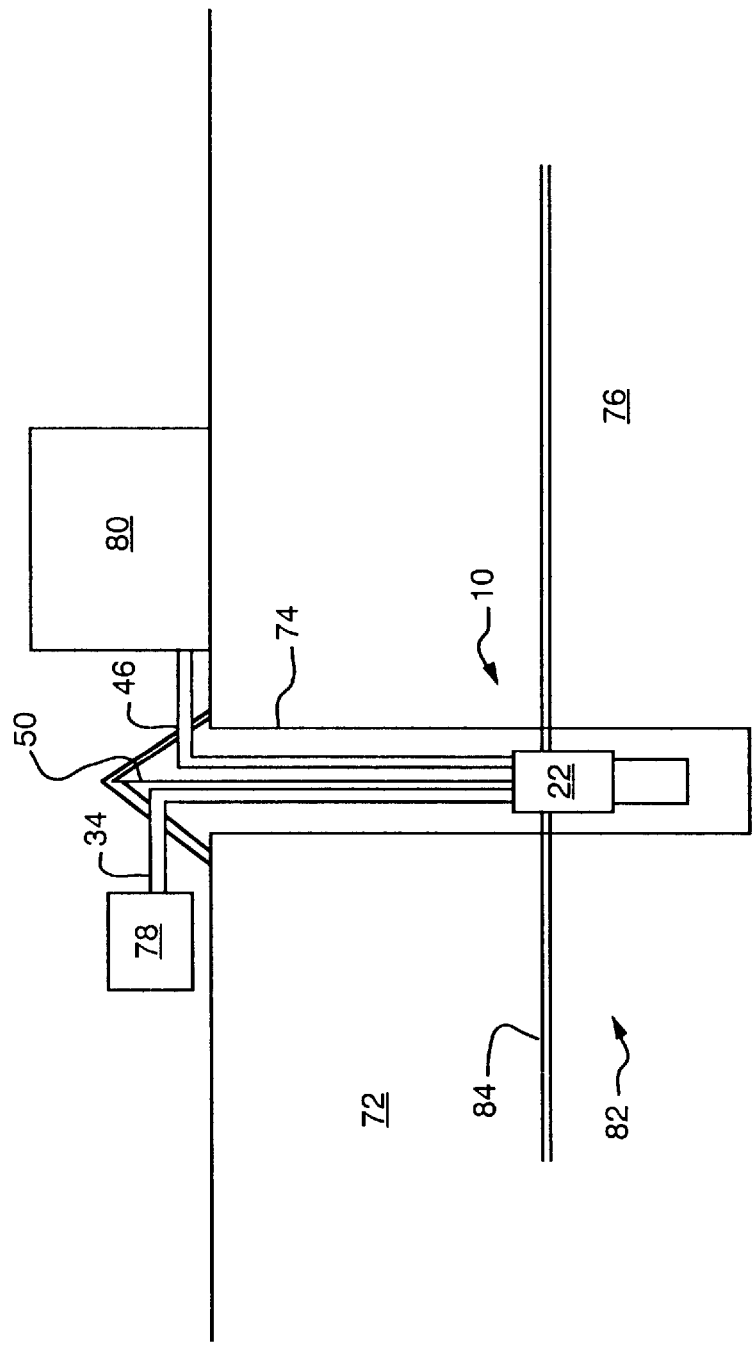
FIG. 2 is a schematic illustration of the remediation apparatus of FIG. 1 deployed at a site contaminated with a hazardous substance.

Referring to FIGS. 1 and 2 wherein like reference numerals refer to like parts, there is illustrated a remediation apparatus 10. The remediation apparatus 10 generally includes a first chamber 12 and a second chamber 14. Typically, the remediation apparatus 10 also includes a buoyancy adjusting means 16. The apparatus 10 is sized and shaped to be positionable within the confines of a well pipe. The lengths of the first chamber 12 and second chamber 14 can be selected as desired for a given application. The diameter of the apparatus 10 can also be altered as desired in order to permit positioning in the well pipe utilized at a given contaminated site.

The first chamber 12 defines a first tubular interior cavity 18. The sidewalls 20 of the cavity 18 are formed of a membrane 22. In the preferred embodiment of the invention as depicted in FIGS. 1 and 2, the membrane 22 is formed of a dimensionally stable hydrophobic and oleophilic substrate. To further refine its permeability characteristics, the membrane 22 preferably has an average pore size of 10 microns. In this configuration, the membrane 22 is selectively permeable to hydrocarbon substances. More particularly, the selective permeability of the membrane 22 permits only certain hydrocarbon substances, for example, gasoline, diesel fuel, jet fuel, and number two (2) heating oil, to migrate from the surrounding contaminated area into the first chamber 18. As those skilled-in-the-art will appreciate, these characteristics, i.e., hydrophobicity, oleophilicity, and pore size, can be manipulated as desired in order to selectively isolate a variety of hydrocarbon substances from groundwater. The hydrophobic characteristic of the membrane 22 keeps groundwater from flowing into the first chamber 18. A particularly useful membrane 22 having the preferred characteristics is manufactured by Porex Technologies, Fairburn, Ga., and has a "Fine" classification. If desired, a protective sheath 64 can be positioned on the membrane 22.

A top plate 24 is attached to a top portion of the membrane 22. A bottom plate 38 forms the base of the first cavity 18. Both the top plate 24, and bottom plate 38, seal their respective ends of the first chamber 12. The plates 24 and 38 can be attached to the membrane 22 by virtually any technique familiar to those skilled-in-the-art providing that a seal is created between the components. External clamps 62 can assist to form the desired seals. Centrally located on the top plate 24 is an attachment 48 for connecting a cord 50 to the apparatus 10. As shown best in FIG. 1, the attachment 48 can be an eyebolt 58 and nut 60 assembly appropriately positioned in an aperture 56 in the top plate 24. Bottom plate 38 typically includes a central aperture 52 having a check valve 54 positioned therein. The check valve 54 acts as a connecting means between the first and second chambers 12 and 14. The top plate 24 and bottom plate 38 can be formed of virtually any durable material including, for example, stainless steel.

Preferably, the top plate 24 includes two apertures 26 and 28. Located in bottom plate 38 at positions complementary to the apertures 26 and 28 are apertures 40 and 42. The apertures 26 and 28 are sized and shaped to receive a pair of connectors 30 and 32. Apertures 40 and 42 are configured to receive tubing 36 and 44 discussed in detail immediately below. More particularly, with regard to connector 30, a hose 34 is affixed to one end with the tube 36 connected to the other. The tube 36 extends from the connector 30 through the aperture 40 in bottom plate 38. The aperture 40 is sized to interferringly engage the tube 36. A hose 46 extends externally away from the connector 32. Internally, tube 44 extends from the connector 32, through the aperture 42, and into the second chamber 14. The tube 44 also interferringly engages the walls of the aperture 42.

The second chamber 14 defines a second tubular interior cavity 66 having sidewalls 68. The sidewalls 68 of the cavity 18 are formed using a non-permeable metallic substrate, for example, stainless steel. The bottom plate 38 encloses one end of the cavity 66. Like the membrane 22, the sidewalls 68 can be attached to the bottom plate 38 by virtually any technique familiar to those skilled-in-the-art providing that a seal is created between the components. External clamp 62 can be employed to secure the seal. The opposing end of the cavity 66 is formed by buoyancy adjusting means 16. A gasket 70 is positioned between sidewalls 68 and buoyancy adjusting means 16 to insure the desired seal. In operation, the buoyancy adjusting means 16 maintains the apparatus 10 in an upright position. In addition, the buoyancy adjusting means 16 serves to adjust the position of the apparatus 10, via-a-vis The groundwater level, as the hazardous substance is removed from the site.

In operation the apparatus 10 acts to quickly and effectively remediate a site contaminated with a hazardous substance. In particular, membrane 22 functions to selectively remove the hazardous substance from the contaminated site without disturbing the groundwater. Flow across the membrane 22 is maintained as a function of the concentration gradient of the hazardous substance outside of the apparatus 10 as compared to that within the apparatus 10. Once positioned at the site, the apparatus 10 permits continuous, safe, and efficient remediation of the contaminate site.

Referring to FIG. 2, upon arrival at a contaminated site 72 a recovery well 74 is drilled into the ground. Preferably, the well 74 is centrally positioned in the contamination plum 76. Well 74 is drilled into the ground until it extends below the level of groundwater 82 present at the contaminated site 72.

In the next phase, the apparatus 10 is prepared for insertion into the well 74. In particular, a gas-injection pump 78 is connected to one end of the hose 34. The gas injected by the pump 78 preferably is an inert gas that will not react with hazardous substance 84 being removed from the contaminated site 72. The other end of the hose 34 is connected to connector 30 in aperture 26 of the apparatus 10. A treatment vessel 80 is then connected to the hose 46 which is, in turn, connected to the connector 32 in aperture 28 of the apparatus 10. Using the cord 50, the apparatus 10 is then lowered into the well 74 until the membrane 22 rests at the interface between the groundwater 82 and contaminating hazardous substance 84.

Once positioned at the interface of the groundwater 82 and contaminating hazardous substance 84, a flow of hazardous substance 84 into first cavity 18 is virtually immediately established As noted above, the flow is a function of the concentration gradient across the membrane 22. In particular, the hazardous substance 84 flows across the membrane 22 from the outside, wherein it is at a relatively high concentration, into the first cavity 18 where it is at an essentially zero concentration. Advantageously, since the flow occurs at a rate established by the concentration gradient it does not disturb the groundwater 82. This smooth operation of the apparatus 10 insures that the hazardous substance 84 is not further mixed into the groundwater 82 and, thus, contaminated site 72.

Isolated in the first cavity 18, the hazardous substance 84 then flows through the check valve 54 into the second cavity 66 As additional substance 84 collects in cavity 66, the apparatus 10 gradually sinks deeper into the groundwater 82 in the well 74. Buoyancy adjusting means 16 serves to maintain the apparatus 10 upright as this action occurs. The gradual sinking of the apparatus 10 insures that a clean, new cross-section of membrane 22 is continuously exposed to the hazardous substance 84. Exposure of a clean membrane 22 is desired in order to insure efficient isolation of the hazardous substance 84.

When a sufficient amount of hazardous substance 84 has accumulated in the second cavity 66, or at predetermined time intervals, the gas-injection pump 78 is activated. Pressurized gas from the pump 78 enters the second cavity via hoses 34 and 36 causing the check valve 54 to close. Typically, the reaction time of the check valve 54 is such that some portion of pressurized gas enters into the first cavity 18 and escapes through the membrane 22. This escape of gas advantageously cleanses the membrane 22, preparing it for further isolation of hazardous substance 84. Once the check valve 54 is closed, pressure in the second cavity increases until the isolated hazardous substance 84, i.e., product, begins to flow though hoses 44 and 46 into the vessel 80. Pumping in this manner continues until the level of the hazardous substance 84 in the second chamber 66 falls below the end of the tube 44. Once in the vessel 80, the hazardous substance 84 can be transported from the contaminated site 72 and treated as necessary to render it inert.

The above-described cycle of isolation and removal continues until the contaminated site 72 is remediated. The self-cleaning action of the gas-injection system described above permits continuous, uninterrupted action of the apparatus 10. Should the gas-injection system fail, or for any reason be inappropriate for a given application, the second chamber 14 can be mechanically emptied. More particularly, at selected intervals the apparatus 10 can be removed from the well 74, the buoyancy means 16 removed from the base of the apparatus 10, and the hazardous substance 84 poured out.

Figure 3:
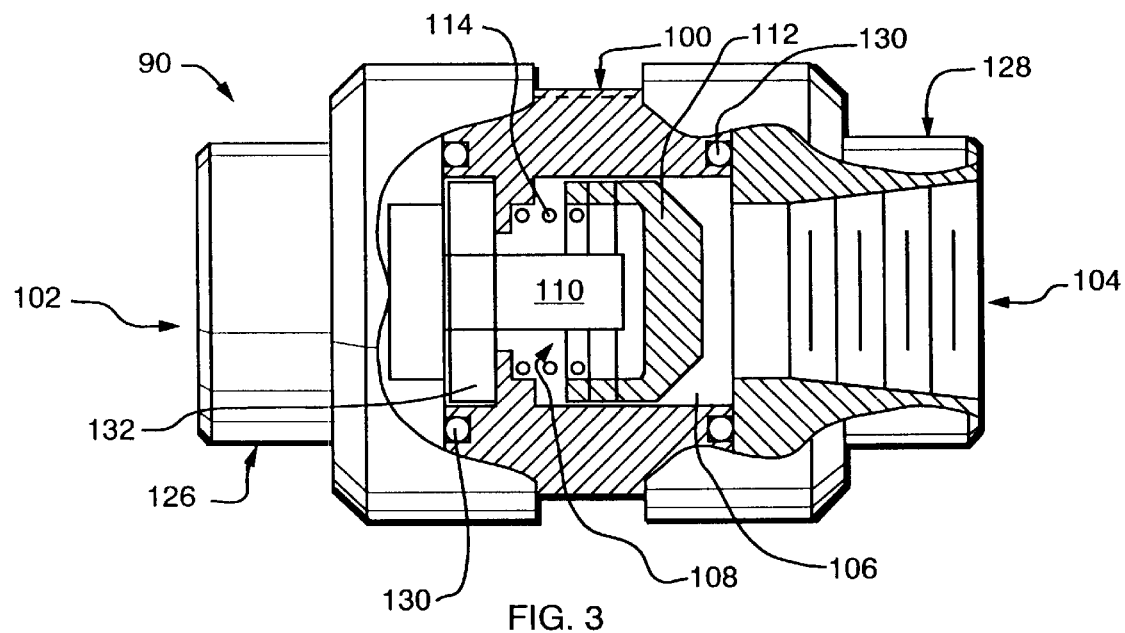
FIG. 3 is a side view, partly cut-away, of the valve of the invention in the open position.
Figure 4:
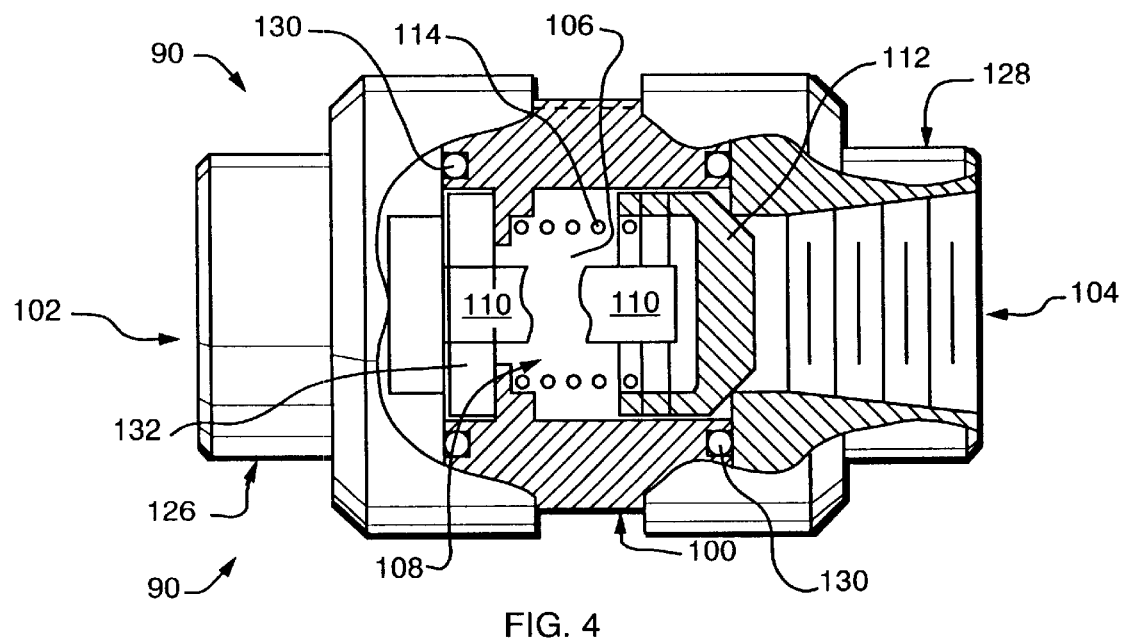
FIG. 4 is a side view, partly cut-away, of the valve of the invention in the closed position; and, FIG. 5 is a schematic illustration of the valve of FIGS. 3 and 4 positioned on a pumping system.
Figure 5:
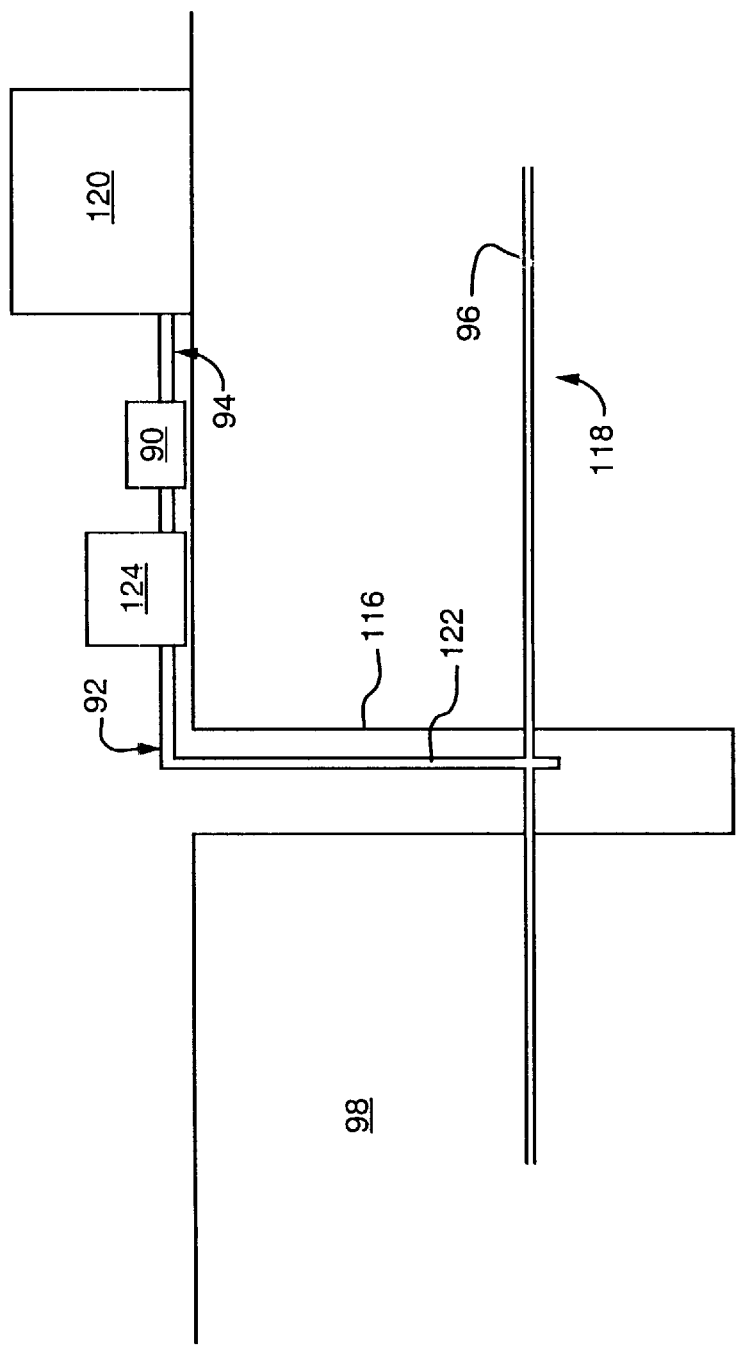

Referring to FIGS. 3 through 5, there is depicted a valve 90. Valve 90 is configured to protect remediation apparatuses from overloadings of a hazardous substance 96. As discussed in detail with regard to FIG. 5, the valve 90 is typically positioned intermediate a subsurface pumping system 92 and a means for connecting the valve to a containment or treatment vessel 94. The subsurface pumping system 92 removes the hazardous substance 96 from the contaminated site 98. The subsurface pumping system generally includes piping 122 and an appropriate pump 124.

Referring to FIGS. 3 and 4, the protective valve 90 of the invention is movable from a first open position (shown in FIG. 3) to a second closed position (shown in FIG. 4) in response to the concentration of the hazardous substance 96 removed from the site 98. The concentration sensitive operation of the valve 90 provides the desired protection from potentially detrimental overloadings of the contaminating hazardous substance 96. Although configured for use in connection with the bulk removal of contaminants 96 from a site 98, depending on the nature of the substance 96 removed the valve 90 can be configured for use in connection with smaller scale operations.

The valve 90 includes a valve housing 100 having a fluid inlet port 102, a fluid exhaust port 104, and a bore 106 in fluid communication with the inlet port 102 and exhaust port 104. The inlet port 102 and exhaust port 104 can be integral components of the valve housing 100. Alternatively, as shown in FIGS. 3 and 4, the ports 102 and 104 can be manufactured as individual components 126 and 128, respectively, that are secured to the valve housing 100. Gaskets .130 are positioned at the connections of the components 126, 128, and 100 to avoid fluid leakage. A valve means 108, including a flange 112 and biasing means 114, is movably positioned in the bore 106 so that in the first open position, depicted in FIG. 3, flow is allowed between the inlet port 102 and exhaust port 104. The flange 112 is complementary in size and shape to the bore 106. When the valve means 108 moves to its second closed position as depicted in FIG. 4, communication is blocked between the inlet port 102 and exhaust port 104. The housing 100 and valve means 108 can be formed of virtually any durable material including, for example, delrin and stainless steel.

A sensor means 110 directs movement of the flange 112 of the valve means 108 from the open position to the closed position. The sensor means 110 is sensitive to the concentration of the hazardous substance 96 removed from the site 98. In the preferred embodiment of the invention as depicted in FIGS. 3 and 4, the sensor means 110 is sensitized to the concentration of hydrocarbons being removed from the contaminated site 98. Typically, the sensor means 110 is a endless strip of polystyrene. The sensor means 110 encircles both a portion of the flange 112 and a pylon 132 positioned in bore 106.

In operation, the sensor means 110 closes the valving means 108 when a selected concentration of the hazardous substance 96, i.e., product, is exceeded. To set the sensor means 110 it is placed about a portion of the flange 112 and the pylon 132 such that the bias means 114 is placed under tension. As shown in FIG. 4, when the concentration of the hazardous substance 96 exceeds a selected level the sensor means 110 fails permitting the bias means 114 to expand. The concentration at which the sensor means 110 fails is selected based on the sensitivity of the carbon-based treatment system utilized for the remediation of the contaminated site 98. As the bias means 114 expands it forces the flange 112 forward closing the valve 90.

Referring to FIG. 5, upon arrival at a contaminated site 98 a recovery well 116 is drilled into the ground. Well 116 is drilled into the ground until it extends below the level of groundwater 118 present at the contaminated site 98.

In the next phase, the valve 90 is positioned intermediate the subsurface pumping system 92 and the means for connecting the valve to a containment or treatment vessel 94. The pumping system 92 is then activated in order to remove both the hazardous substance 96 and groundwater 118 in bulk from the contaminated site 98. As the hazardous substance 96 and groundwater 118 flow from the site 98 to the treatment vessel 120, they pass through the valve 90. Should the concentration of the hazardous substance 96 exceed a preselected level the sensor means 110 will activate, i.e., fail, resulting in closure of the valve 90. Pumping can only recommence if the sensor means 110 is replaced, and the flange 112 and bias means 114 re-set.

It will thus be seen that the invention efficiently attains the objects set forth above, among those made apparent from the preceding description.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. An apparatus for the remediation of a site contaminated with a hazardous substance, said apparatus comprising:

a subsurface pumping system, said pumping system including a means for removing the hazardous substance contained in a phase separate from groundwater present at the site;

a valve in fluid connection with said subsurface pumping system, said valve being movable from a first open position to a second closed position in response to the concentration of the hazardous substance removed from the site by said means for removing the hazardous substance;

a means for connecting said valve means to a treatment vessel, said means transporting said contaminated groundwater to said treatment vessel.

2. The apparatus of claim 1 wherein said valve includes a valve housing having a fluid inlet port, a fluid exhaust port, and a bore in fluid communication with said inlet port and said exhaust port.

3. The apparatus of claim 2 wherein said valve further includes a valving means movable in said bore so that in said first open position flow is allowed between said inlet port and said exhaust port and in said second closed position communication is blocked between said inlet port and said exhaust port.

4. The apparatus of claim 3 wherein said valve further includes a sensor means, said sensor means directing the movement of said valving means from said first open position to said second closed position when concentration of the hazardous substance removed from the site exceeds a selected level.

* * * * *